United States Patent [19]

Langa

[11] Patent Number: 4,541,569
[45] Date of Patent: Sep. 17, 1985

[54] DRIP IRRIGATION CONDUIT AND METHOD OF MAKING THE SAME

[75] Inventor: John M. Langa, Alpine, Calif.

[73] Assignee: RIS Irrigation Systems, El Cajon, Calif.

[21] Appl. No.: 610,960

[22] Filed: May 16, 1984

Related U.S. Application Data

[62] Division of Ser. No. 275,837, Jun. 22, 1981, Pat. No. 4,474,330.

[51] Int. Cl.⁴ .................. A01G 25/02; B29D 23/03
[52] U.S. Cl. ........................ 239/450; 156/244.19; 239/542; 264/209.1
[58] Field of Search ............... 239/542, 145, 450; 138/111, 114–117; 264/155, 156, 209.1; 156/244.13, 244.18, 244.19

[56] References Cited

U.S. PATENT DOCUMENTS

| | | | |
|---|---|---|---|
| 3,672,571 | 6/1972 | Goodricke | 239/450 X |
| 3,698,195 | 10/1972 | Chapin | 239/542 X |
| 4,139,159 | 2/1979 | Inoue et al. | 239/145 X |

Primary Examiner—Andres Kashnikow
Attorney, Agent, or Firm—Gordon L. Peterson

[57] ABSTRACT

An irrigation conduit comprising an extruded tube having a peripheral wall and at least one elongated passage and an elongated supply tube having an elongated supply passage. The supply tube is formed of sheet material joined together along longitudinally extending portions to form a seam. A region of the sheet material extends at least part way around the perimeter of the extruded tube, and the extruded tube is retained on such region of the sheet material. Transfer ports extend between the passages of the two tubes and discharge ports extend from the passage of the extruded tube to the exterior of the irrigation conduit.

14 Claims, 18 Drawing Figures

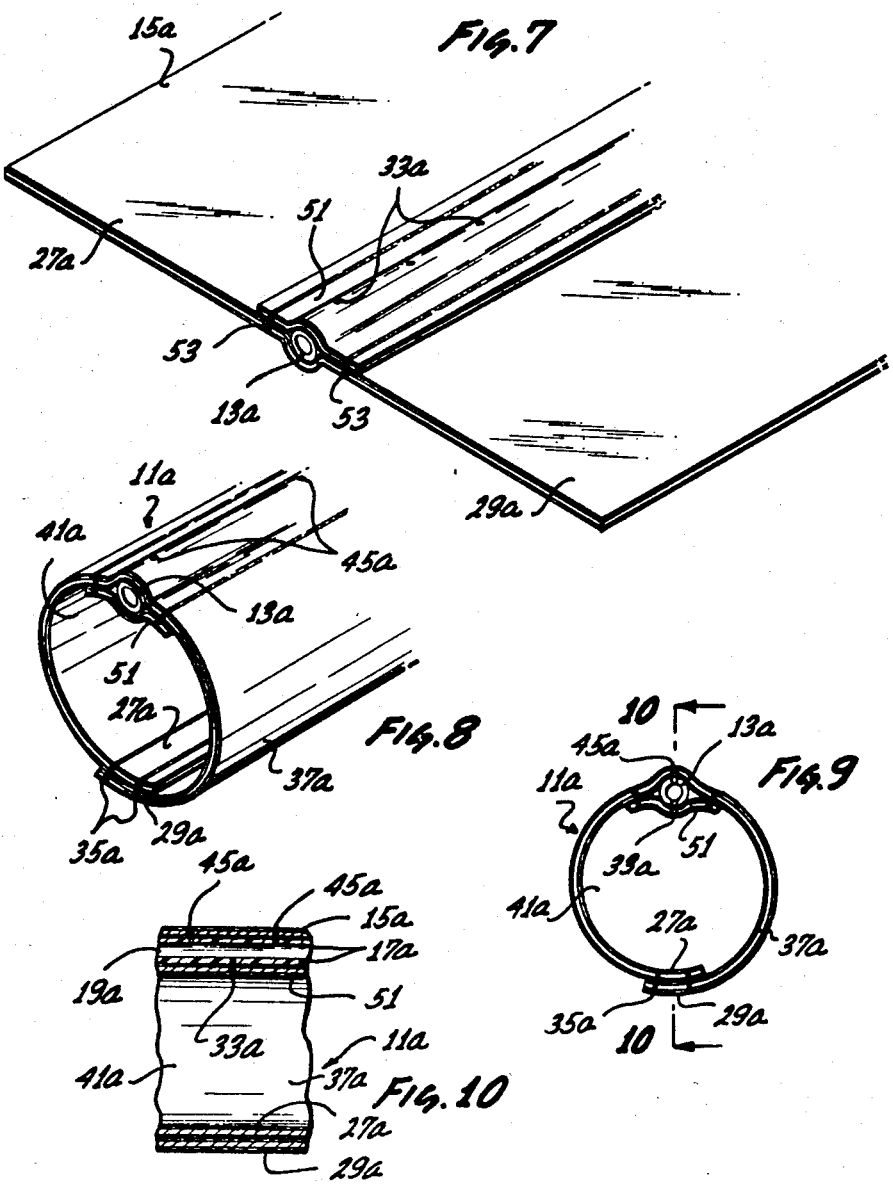

DRIP IRRIGATION CONDUIT AND METHOD OF MAKING THE SAME

This application is a division of application Ser. No. 275,837, filed 6/22/81 now U.S. Pat. No. 4,474,330.

BACKGROUND OF THE INVENTION

Drip irrigation conduits receive water under pressure and discharge the water at a slow trickle or drip rate. In order to do this, the irrigation conduit must substantially reduce the pressure of the water. Generally, pressure reduction is provided by using controlled orifices as shown, by way of example, in Chapin Reissue Pat. No. 28,095 and Mock U.S. Pat. No. 3,903,929 or by using an elongated capillary tube having a capillary passage of very small cross-sectional area as shown, by way of example, in allowed Menzel et al U.S. Pat. No. 4,269,357.

Regardless of the manner in which pressure reduction is accomplished, drip irrigation conduits typically include an elongated supply tube having a supply passage and one or more secondary tubes extending along the supply tube. Transfer ports extend between the supply passage and the passage of the secondary tube, and discharge ports extend from the passage of the secondary tube to the exterior of the irrigation conduit or to one or more additional secondary tubes from which the water is ultimately discharged to the exterior of the irrigation conduit at the desired trickle rate.

Drip irrigation conduits of this type can be extruded as shown by Mock U.S. Pat. No. 3,903,929 or the secondary tube and a section of sheet material can be extruded as shown in the Menzel et al patent. In either event, the extrusion of the secondary tube in association with the supply tube or in association with sheet material to form the primary tube has been found somewhat difficult to control, particularly when the secondary tube is to be a capillary tube having a very small cross-sectional area capillary passage. In addition, extrusion of the supply tube precludes the use of inexpensive film materials and paper for the supply tube.

Allport U.S. Pat. No. 4,247,051 discloses a drip irrigation conduit in which a section of sheet material is joined together along longitudinally extending regions by circumferentially spaced and radially thick ribs of adhesive. The sheet material forms the supply passage, and the ribs and sheet material cooperate to define the secondary passage. The deposition of two or more relatively thick adhesive ribs of constant thickness and the careful pressurizing of the thick adhesive ribs between overlapping regions of the sheet material to form a secondary passage of controlled cross-sectional area is believed to be very difficult to accomplish in production.

SUMMARY OF THE INVENTION

This invention provides a drip irrigation conduit and method of making a drip irrigation conduit which generally overcome the disadvantages noted above. With the method of this invention, the secondary tube is initially provided as a separate tube completely detached from a supply tube or the sheet material from which the supply tube is to be made. The supply tube is constructed of a section of sheet material having longitudinally extending portions joined together to form a seam to thereby form the supply tube. Accordingly, the supply tube can be formed of a variety of materials, including thin film plastics and paper.

The supply tube and the secondary tube can be joined together in various different ways. Preferably, a region of the sheet material extends at least part way around the periphery of the secondary tube, and the secondary tube is retained on such region of the sheet material.

The secondary tube can be formed in any way that provides the desired control of the cross-sectional area of the secondary passage at a reasonable cost. For a capillary tube, it is preferred to extrude the secondary tube, and commercially available extruded tubing of suitable plastic material can be utilized.

In making the irrigation conduit of this invention, the secondary tube is preferably attached to the sheet material and then longitudinally extending portions of the sheet material are attached to each other to form the sheet material into the supply tube. Attaching of the secondary tube to the sheet material preferably includes bonding, as by an adhesive or heat sealing the secondary tube to the sheet material prior to forming the sheet material into the supply tube. The supply tube typically has a larger cross-sectional area when filled with water than the cross-sectional area of the passage of the secondary tube. The transfer ports, which lead from the supply passage to the secondary passage, and/or the discharge ports, which lead from the secondary passage to the exterior of the supply tube and the secondary tube, can advantageously be formed prior to the formation of the sheet material into the supply tube. Typically, the discharge ports extend from the secondary passage to the exterior of the irrigation conduit, although they may extend, if desired, into one or more additional secondary tubes for further pressure reduction of the water and ultimate discharge of the water to the exterior of the irrigation conduit at the desired trickle rate.

The retention of the secondary tube by the supply tube can be accomplished in many different ways in addition to, or in lieu of, the attachment between the secondary tube and sheet described above. For example, the longitudinally extending portions can be overlapped to define a retaining tube, and the secondary tube may be retained within the retaining tube. In this embodiment, the transfer ports preferably extend from the supply passage through one of the overlapping portions, and the peripheral wall of the secondary tube and the discharge ports extend through the peripheral wall of the secondary tube and the other of the overlapping portions.

Alternatively, the sheet material may include first and second sheets of sheet material which define a retaining tube, and the secondary tube can be retained in the retaining tube between the sheets. With this embodiment, the transfer ports preferably extend from the supply passage through the second sheet and the peripheral wall of the secondary tube, and the discharge ports extend through the peripheral wall of the secondary tube and the first sheet.

If desired, the sheet can be wrapped part way, for example, half way around the periphery of the secondary tube and suitably bonded to it. In this event, the transfer ports preferably extend through the peripheral wall of the secondary tube, and the discharge ports extend through the peripheral wall of the secondary tube and the sheet.

The retention may include attaching the sheet material to the secondary tube along at least two zones of the sheet material, with such zones being spaced circumferentially on the secondary tube. With this construction, the supply tube includes the region of the sheet material between such zones and the secondary tube also serves to close the supply tube. With this construction, the transfer and discharge ports may extend solely through the secondary tube, and the sheet material may extend outwardly from the zones to define one or more flaps which can be used, for example, to prevent water which may be forced through the discharge ports at too high a velocity from being emitted as a stream.

In the first three embodiments described above, the flexible sheet is preferably formed so that it completely encloses the secondary tube. In addition, if a second sheet is used to retain the secondary tube, such second sheet is preferably of lesser dimension than the first sheet and is also enclosed by the supply tube. Thus, the supply tube can be used to house and protect the other components of the irrigation conduit.

This invention is also applicable to a drip irrigation conduit which comprises a plurality of secondary tubes with transfer ports leading from the supply passage to each of the secondary tubes, and with discharge ports leading from each of the secondary tubes to the exterior of the irrigation conduit or to additional secondary tubes which in turn lead to the exterior of the irrigation conduit.

The invention, together with additional features and advantages thereof, may best be understood by reference to the following description taken in connection with the accompanying illustrative drawing.

BRIEF DESCRIPTION OF THE DRAWING

FIG. 7 is a perspective view similar to FIG. 1 illustrating the second embodiment of the invention.

FIG. 8 is a fragmentary perspective view of a drip irrigation conduit made from the construction shown in FIG. 7.

FIG. 9 is an end elevational view of the drip irrigation conduit.

FIG. 10 is a fragmentary sectional view taken generally along line 10—10 of FIG. 9.

DESCRIPTION OF THE PREFERRED EMBODIMENT

Figure 3:
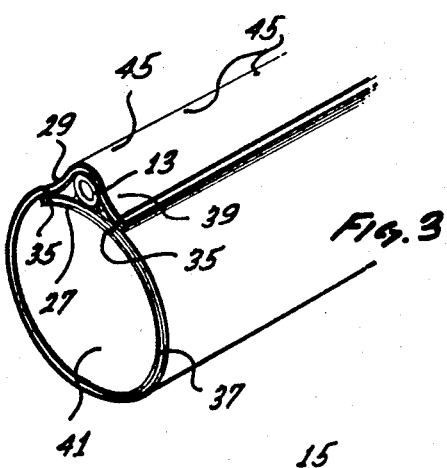
FIG. 3 is a fragmentary perspective view of one form of drip irrigation conduit.
Figure 4:
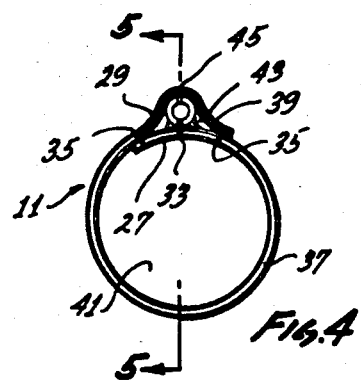
FIG. 4 is an end elevational view of the irrigation conduit.
Figure 5:
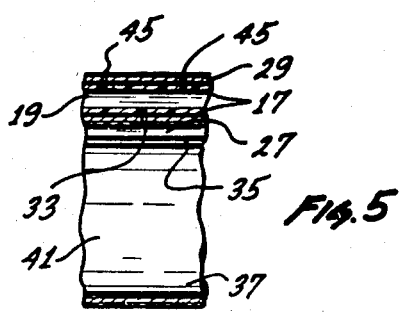
FIG. 5 is a fragmentary sectional view of the irrigation conduit taken along line 5—5 of FIG. 4.

FIGS. 3-5 show an irrigation conduit 11 constructed from a preformed, secondary tube 13 and a sheet 15 of flexible, water impervious sheet material. Although the secondary tube 13 can be seamed or seamless, in the embodiment illustrated, it is a seamless extruded capillary tube of generally cylindrical configuration having a cylindrical peripheral wall 17 and a cylindrical axial secondary passage 19. The secondary tube 13 is preferably flexible and may be extruded from a suitable water impervious plastic material. Although controlled orifice pressure regulation could be utilized, in the embodiment illustrated, the secondary passage 19 is of very small diameter so that it affords a substantial restriction to flow which is sufficient to provide the desired drip or trickle irrigation. All of the illustrated embodiments of the invention may achieve trickle flow using a capillary or controlled orifice.

Figure 6:
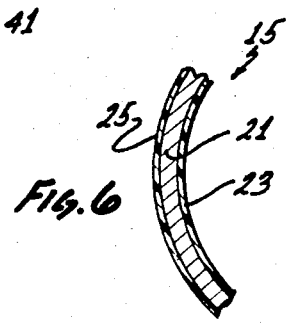
FIG. 6 is an enlarged fragmentary sectional view illustrating one form of the flexible sheet material.

The sheet 15 may be constructed of various materials, including paper, impregnated paper, plastic, a paper-plastic laminate, etc. In the embodiment illustrated, the sheet 15 is constructed of a laminate which comprises a layer 21 (FIG. 6) of biodegradable paper sandwiched between an inner layer 23 and an outer layer 25 of extremely thin substantially impervious film plastic.

The tube 13 and the sheet 15 are elongated, and the sheet has longitudinally extending portions in the form of longitudinally extending edge portions 27 and 29. The tube 13 is bonded to the edge portion 27 of the sheet 15 by heat sealing of the abutting plastic materials and/or by an adhesive along a zone 31, with the bond preferably extending continuously along the secondary tube.

Although they could be formed later, a plurality of transfer ports 33 are preferably formed through the sheet 15 and the peripheral wall 17, with the sheet 15 in the flat condition. Next, the sheet 15 is folded to bring the longitudinal edge portion 29 over the secondary tube 13 and the longitudinal edge portion as shown in FIGS. 3 and 4, and the longitudinal edge portion are bonded together along two circumferentially spaced longitudinally extending zones 35 to thereby form a supply tube 37 and a retaining tube 39, both of which extend longitudinally.

The supply tube 37 has a supply passage 41 which is adapted to be coupled to a source of irrigation water under pressure. The cross-sectional area of the supply passage 41 is substantially greater than the cross-sectional area of the secondary passage 19. The supply passage 41 and the supply tube 37 are illustrated in a generally cylindrical configuration, which is the general configuration they assume when subjected to water under pressure. However, because the supply tube 37 is formed of flexible sheet material, it can assume a flat condition for storage.

The retaining tube 39 is separated from the supply passage 41 by the longitudinal edge portion 27, and it contains the secondary tube 13 in a retaining passage 43. The retaining tube 39 protects the secondary tube 13 and protects the bonds 31 to assure that the secondary tube will not become inadvertently detached from the irrigation conduit. The secondary tube 13 is retained, in part, by the longitudinal edge portions 27 and 29 which completely surround the secondary tube.

With the sheet 15 bonded together along the zones 35 (as shown in FIGS. 3 and 4), discharge ports 45 are formed through the longitudinal edge portion 27 and the peripheral wall 17. Although the discharge ports 45 could be formed with the sheet 15 in the flat condition of FIGS. 1 and 2, formation of the discharge ports 45 after formation of the supply tube 37 eliminates the need to accurately align the portions of the discharge ports 45 when the sheet 15 is folded to form the supply tube 37. One of the transfer ports 33 can serve a plurality of the discharge ports 45, and the transfer ports 33 and the discharge ports 45 need not have controlled dimensions because the secondary passage 19 affords an adequate restriction to water flow to cause water to be emitted to the exterior of the irrigation conduit 11 by the discharge ports 45 at the desired trickle or drip rate. The discharge ports 45 will typically be spaced apart greater distances than that shown in FIGS. 3 and 5.

In use, water flows from the supply passage 41 to the transfer ports 33 and out through the discharge ports 45 to the exterior of the irrigation conduit. Of course, one or more additional secondary tubes could be provided in series with the secondary tube 13, if desired, in which event, the discharge ports 45 would communicate with the next adjacent secondary tube. Of course, the cross-sectional area of the secondary passage 19 could be materially enlarged, and the ports 33 and 45 could be appropriately sized to provide the desired pressure drop.

FIGS. 7-10 show a second embodiment of the invention, and portions of this embodiment corresponding to the embodiment of FIGS. 1-6 are designated by corresponding reference numerals followed by the letter "a." Except as shown and described herein, the embodiment of FIGS. 7-10 is identical to the embodiment of FIGS. 1-6.

As shown in FIG. 7, the secondary tube 13a is held on a sheet which includes the sheet 15a and a sheet 51 which, in the embodiment illustrated, is much narrower than the sheet 15a. The sheet 15a and the sheet 51 each extend around about 180 degrees of the secondary tube 13a, and the sheet 51 is bonded to the sheet 15a as by heat sealing or an adhesive continuously along longitudinally extending regions 53. Thus, the secondary tube 13a is held between the sheets 15a and 51 which form a retaining tube 39a. Although the tube 13a could be positioned at various locations transversely of the sheet 15a, in the form shown in FIG. 7, it is centrally positioned with respect to the sheet 15a and extends longitudinally thereof. The sheet 51 may be constructed of a material which is identical to the material of the sheet 15a.

Preferably, the transfer ports 33a and the discharge ports 45a are formed with the sheet 15a in the flat, unfolded condition of FIG. 7. As shown in FIG. 10, the transfer ports 33a extend through the sheet 51 and the peripheral wall 17a to the secondary passage 19a, and the discharge ports 45a extend through the peripheral wall 17a and the sheet 15a.

The sheet 15a is then formed into the supply tube 37a by bonding the longitudinal edge portions 27a and 29a together along one or more longitudinally extending zones 35a to thereby form a longitudinally extending seam. Although the sheet 51 could be on the exterior of the irrigation conduit 11a, it is shown within the supply passage 41a in FIGS. 8 and 9.

Figure 1:
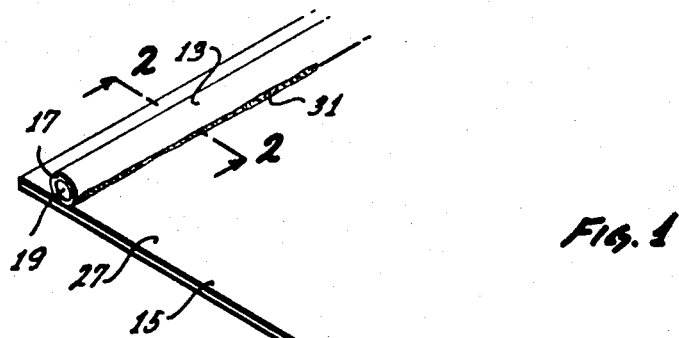
FIG. 1 is a fragmentary perspective view of a preformed secondary tube bonded to a flexible sheet of water impervious material.
Figure 2:
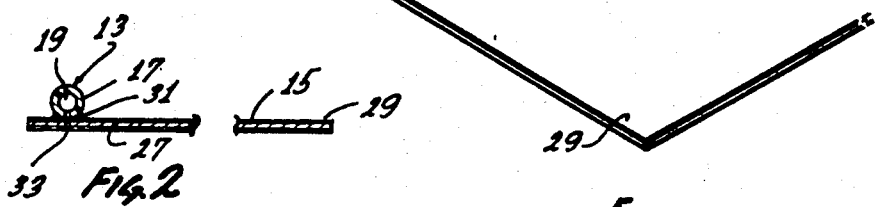
FIG. 2 is an end view of the structure of FIG. 1.

FIGS. 11-14 illustrate a third embodiment of the invention, and portions of this embodiment corresponding to portions of the embodiment of FIG. 1 are designated by corresponding reference numerals followed by the letter "b." Except as specifically shown or described herein, the embodiment of FIGS. 11-14 is identical to the embodiment of FIGS. 1-6.

Figure 11:
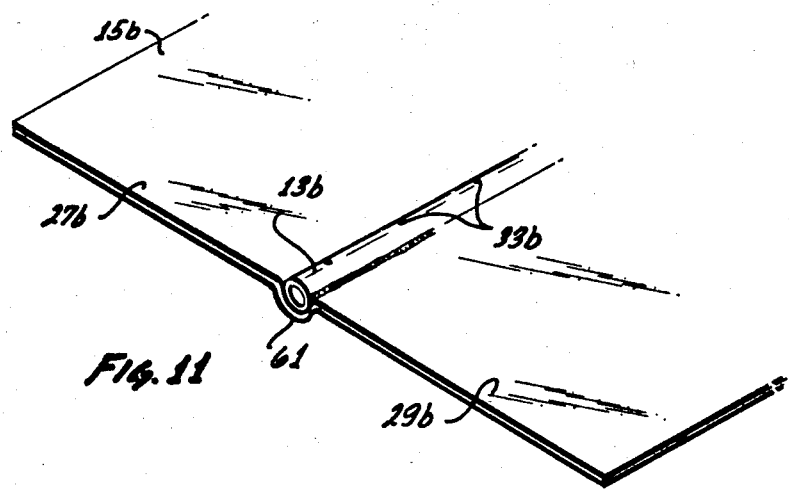
FIG. 11 is a fragmentary perspective view similar to FIG. 1 showing a third embodiment of the invention.
Figure 12:
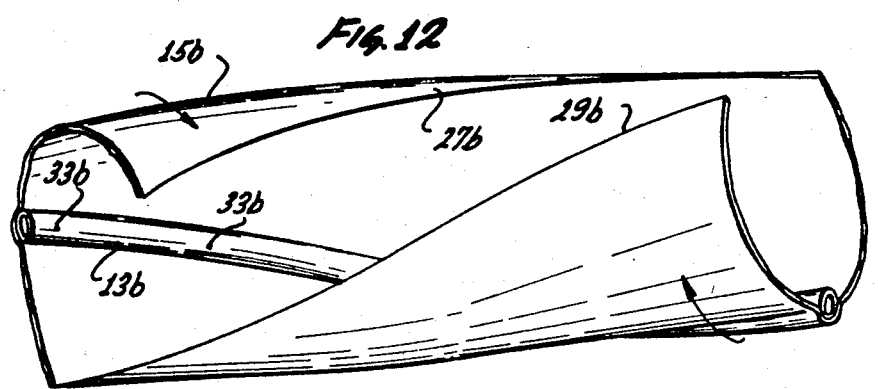
FIG. 12 is a fragmentary perspective view showing how the construction of FIG. 11 can be helically wrapped to form an irrigation conduit.
Figure 13:
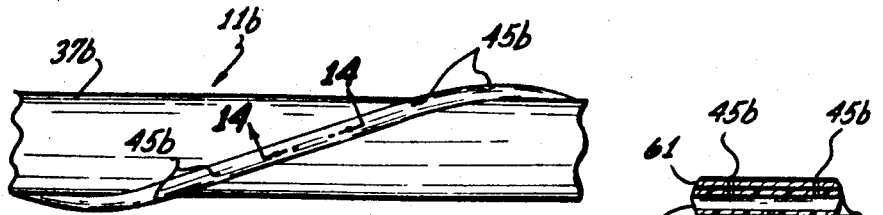
FIG. 13 is a fragmentary side elevational view of the irrigation conduit.
Figure 14:
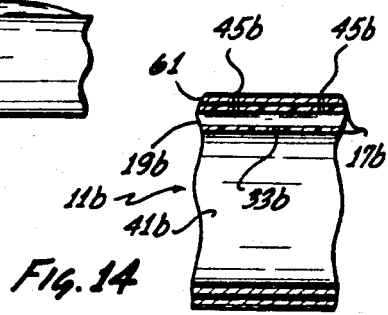
FIG. 14 is a sectional view taken generally along line 14—14 of FIG. 13.

The construction shown in FIG. 11 is identical to the construction shown in FIG. 7, except that the sheet 51 has been eliminated, and the secondary tube 13b is suitably bonded to a semi-circular region 61 of the sheet 15b along the full length and width of the region 61. The region 61 extends about one-half of the way around the periphery of the secondary tube 13b. The transfer ports 33b, which are preferably formed with the sheet 15b in its flat condition, extend solely through the peripheral wall 17b, and the discharge ports 45b, which are also preferably formed with the sheet 15b in its flat condition, extend through the peripheral wall 17b and the region 61 of the sheet 15b.

Although the sheet 15b could be formed into a cylindrical supply tube in the same manner as the embodiments of FIGS. 1-10, it is helically wrapped as shown in FIG. 10 so that the secondary tube 13b extends longitudinally of the supply tube 37b in helical fashion. For purposes of definition, the helical secondary tube 13b is considered to extend longitudinally of the supply tube 37b in that it extends along a path, at least one component of which extends longitudinally along the supply tube. The longitudinally extending edge portions 27b and 29b are bonded together to form a helically extending seam. Of course, the other illustrated embodiments of this invention could be similarly helically formed so that the secondary tube extends helically. Preferably, the sheet 15b is folded so that the secondary tube 13b is completely surrounded by the sheet 15b and lies within the supply passage 41b.

Figure 15:
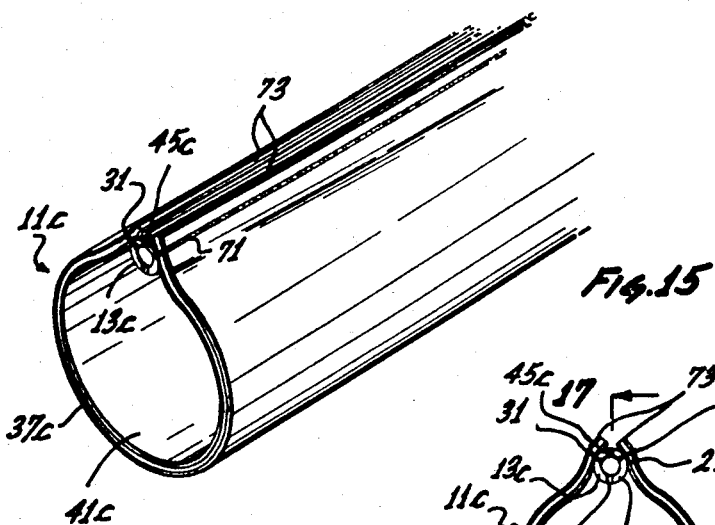
FIG. 15 is a perspective view of a fourth embodiment of the drip irrigation tube constructed in accordance with the teachings of this invention.
Figure 16:
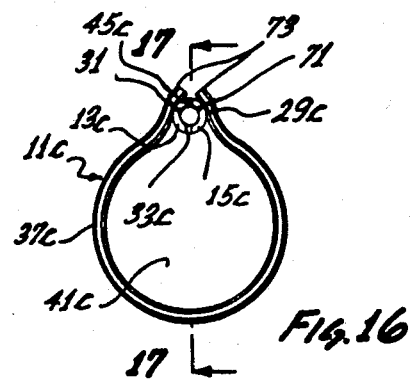
FIG. 16 is an end elevational view of a drip irrigation conduit of FIG. 14.
Figure 17:
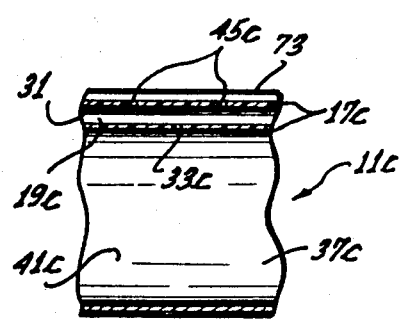
FIG. 17 is an enlarged fragmentary sectional view taken generally along line 17—17 of FIG. 16.

FIGS. 15-17 show a fourth embodiment of the invention which is also identical to the embodiment of FIGS. 1-6, except to the extent shown or described herein. Portions of the embodiment of FIGS. 15-17 corresponding to portions of the embodiment of FIGS. 1-6 are designated by corresponding reference numerals followed by the letter "c."

In making the drip irrigation conduit 11c, the secondary tube 15c can be attached, and oriented with respect to the sheet 15c, essentially in the same manner as shown in FIG. 1. The transfer ports 33c and the discharge ports 45c are formed solely in the peripheral wall 17c, and this is preferably carried out with the sheet 15c in the flat condition of FIG. 1.

To form the supply tube 37c, the longitudinal edge portion 29c is bonded to the secondary tube 13c along a zone 71 which is spaced circumferentially along the secondary tube 13c from the zone 31. By way of example, the zones 31 and 71 may be spaced circumferentially so that they lie substantially at the 10 o'clock and 2 o'clock positions of the secondary tube 13c as viewed in FIG. 16. This forms the sheet 15c into the supply tube 37c and the secondary tube 13c closes the supply tube.

Preferably, at least portions of the edge portions 27c and 29c project beyond the zones 31 and 71, respectively, and away from the supply passage 41c to form flaps 73. The discharge ports 45c are located intermediate the flaps 73. Preferably, the flaps 73 extend toward each other so that they can break up any water stream that may be emitted from the discharge ports 45c. As with the embodiments described above, water flows from the supply passage 41c through the transfer ports 33c, the secondary passage 19c and the discharge ports 45c to the exterior of the irrigation conduit.

Figure 18:
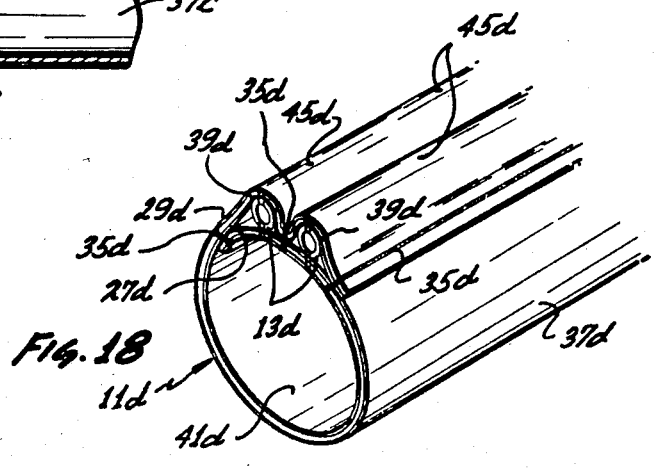
FIG. 18 is a fragmentary perspective view similar to FIG. 4 showing one way in which the present invention is adapted to utilize a plurality of secondary tubes in association with one supply tube.

Each embodiment of this invention may include one or more of the secondary tubes, and FIG. 18 illustrates by way of example how the embodiment of FIGS. 1-6 can be modified to accommodate two secondary tubes 13d. In all respects not shown or described herein, the embodiment of FIG. 18 is identical to the embodiment of FIGS. 1-6, and portions of the embodiment of FIG. 18 corresponding to portions of the embodiment of FIGS. 1-6 are designated by corresponding reference numerals followed by the letter "d."

In FIG. 18, the overlapping regions are widened and an intermediate zone 35d is provided along which the portions 27d and 29d are bonded together to provide two parallel retaining tubes 39d for housing the two secondary tubes 13d, respectively. This provides two rows of discharge ports 45d, and the ports of each row can be axially offset, if desired.

Although exemplary embodiments of the invention have been shown and described, many changes, modifications and substitutions may be made by one having ordinary skill in the art without necessarily departing from the spirit and scope of this invention.

I claim:

1. An irrigation conduit comprising:
   at least one elongated extruded secondary tube having a peripheral wall and at least one elongated secondary passage therein extending in the direction of elongation of the tube;
   a flexible sheet of water impervious material which is separate from the secondary tube;
   first means for attaching said secondary tube to the flexible sheet of water impervious material;
   second means other than said secondary tube for attaching longitudinally extending portions of said sheet to each other to form at least one seam and to provide at least one supply tube having a longitudinal supply passage with said secondary tube extending along the supply tube;
   the cross-sectional area of the supply passage being greater than the cross-sectional area of the secondary passage;
   transfer ports leading between said passages; and
   discharge ports leading from the secondary passage to the exterior of said secondary tube and said supply tube.

2. An irrigation conduit as defined in claim 1 wherein the secondary tube is within the supply tube, the transfer ports are formed in the peripheral wall of the secondary tube and the discharge ports are formed in the secondary tube and the supply tube.

3. An irrigation conduit as defined in claim 2 wherein the secondary tube is constructed of a first material and the sheet is constructed of a second material and said first and second materials are different.

4. An irrigation conduit as defined in claim 3 wherein said second material includes a biodegradable material.

5. An irrigation conduit as defined in claim 1 wherein said sheet has longitudinal edges, said first means attaches the secondary tube to the sheet intermediate said longitudinal edges and said second means attaches said longitudinal edges to each other.

6. An irrigation conduit as defined in claim 5 wherein the secondary tube is within the supply tube, said transfer ports extend through the peripheral wall of the secondary tube and the discharge ports extend through the peripheral wall of the secondary tube and the supply tube.

7. An irrigation conduit as defined in claim 6 wherein the secondary tube is constructed of a first material and the sheet is constructed of a second material and said first and second materials are different, said second material includes a biodegradable material and said secondary passage is a capillary.

8. An irrigation conduit as defined in claim 1 wherein said secondary passage is a capillary.

9. A method of making an irrigation conduit comprising:
   providing at least one elongated extruded secondary tube having a peripheral wall and at least one elongated secondary passage therein extending in the direction of the elongation of the tube;
   providing a flexible sheet of a water impervious material which is separate from the secondary tube;
   attaching said secondary tube to the flexible sheet of water impervious material to form a tube-sheet assembly;
   attaching longitudinally extending portions of said sheet to each other to form the sheet into at least one supply tube subsequent to said first mentioned step of attaching, said supply tube having a longitudinal supply passage with said secondary tube extending along the supply tube;
   forming transfer ports leading between said passages; and
   forming discharge ports leading from the secondary passage to the exterior of the irrigation conduit.

10. A method as defined in claim 9 wherein said step of attaching longitudinally extending portions of the sheet to each other is carried out so as to place the secondary tube within the supply tube, said step of forming transfer ports includes forming the transfer ports in the peripheral wall of the secondary tube and said step of forming discharge ports includes forming the discharge ports in the peripheral wall of the secondary tube and in the adjacent region of the flexible sheet.

11. An irrigation conduit comprising:
   an elongated secondary tube of a first material having a peripheral wall and at least one elongated secondary passage therein, said first material being water impervious;
   an elongated supply tube having an elongated supply passage and at least one longitudinally extending seam, said supply tube including biodegradable sheet material which is a different material than said first material, the cross-sectional area of said supply passage being greater than the cross-sectional area of said secondary passage;
   means for retaining said secondary tube on the sheet material with the secondary tube extending along the length of the supply tube;
   a plurality of transfer ports extending between said passages; and
   a plurality of discharge ports extending from said secondary passage to a location outside said passages whereby water can flow from the supply passage through the transfer ports, the secondary passage and the discharge ports.

12. An irrigation conduit as defined in claim 1 wherein said secondary tube is extruded.

13. An irrigation conduit as defined in claim 11 wherein the secondary passage has a peripheral wall and a portion of the sheet material is adjacent the peripheral wall of the secondary passage.

14. An irrigation conduit as defined in claim 13 wherein the secondary tube is extruded.

* * * * *

UNITED STATES PATENT OFFICE
CERTIFICATE OF CORRECTION

Patent No. 4,541,569　　　　　　　　Dated September 17, 1985

Inventor(s) John M. Langa

It is certified that error appears in the above-identified patent and that said Letters Patent are hereby corrected as shown below:

Claim 12, line 1 change "1" to -- 11 --.

Signed and Sealed this

Twenty-eighth Day of January 1986

[SEAL]

Attest:

DONALD J. QUIGG

Attesting Officer　　　Commissioner of Patents and Trademarks